(No Model.)

E. W. MACKENZIE-HUGHES.
CAR COUPLING.

No. 467,174. Patented Jan. 19, 1892.

Witnesses:

Inventor:
Edward William MacKenzie Hughes
By H. A. deVos
Attorney.

UNITED STATES PATENT OFFICE.

EDWARD WILLIAM MACKENZIE-HUGHES, OF ERICSTANE, HELENSBURGH, SCOTLAND.

CAR-COUPLING.

SPECIFICATION forming part of Letters Patent No. 467,174, dated January 19, 1892.

Application filed November 27, 1891. Serial No. 413,276. (No model.)

*To all whom it may concern:*

Be it known that I, EDWARD WILLIAM MAC-KENZIE-HUGHES, gentleman, a citizen of the United Kingdom of Great Britain and Ireland, residing at Ericstane, Helensburgh, in the county of Dumbarton, Scotland, have invented new and useful Improvements in Car-Couplings, (which have not been patented in any country;) and I do hereby declare that the following is a full, clear, and exact description of the invention, which will enable others skilled in the art or manufacture to which it relates to make and use the same.

This invention has for its object improvements in the manufacture of couplings for railway - carriages, cars, and wagons, and whereby the coupler can be made entirely from wrought-iron or steel instead of cast-iron, or partly of cast and partly of wrought metal, as heretofore, the improved coupling being much lighter in weight and of greater strength than couplers as ordinarily made.

The method of manufacture constituting my invention is illustrated by the accompanying drawings, whereon—

Figure 1:
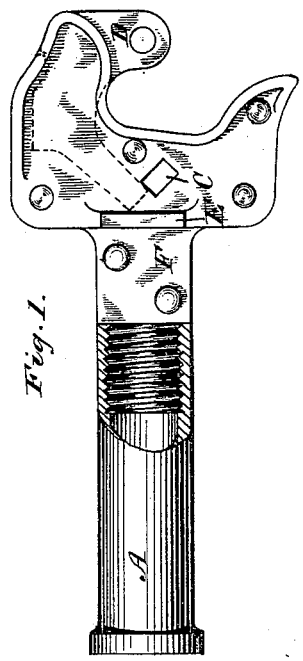
Figure 2:
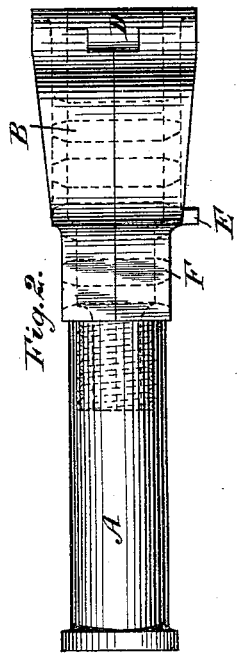

Figure 1 is a plan, partly in section, and Fig. 2 a side elevation of one form of coupler.

The improved method of construction can be applied to any form of coupler, it being understood that I do not claim as part of the invention any particular design, and for illustrative purposes I have depicted the type made by the Standard Car Coupling Company, of Troy, State of New York, United States of America.

As shown by the drawings, the coupler-head is made separately from the shank or stem A, and in producing it the head B is formed in halves, which are butted against each other and bolted, riveted, or otherwise fastened together and screwed into the outer end of the stem A. Each half of the coupler-head is formed from a wrought-iron or steel plate by the action of dies or cramps actuated by hydraulic or other power, the screw being formed at the same time or subsequently. Holes C are made in the web of each half of the head to receive the locking-pin of the knuckle D, the latter being made from a solid block of wrought metal and working between the cheeks of the head. The part marked E is forged on the top half of the head, and the part marked F is made square to prevent the coupler from turning round when in place.

Having now described the invention, what I desire to claim and secure by Letters Patent is—

1. In a car-coupler, the combination of a shank made from a wrought-metal tube and screwed at one end, a coupler-head made in two sections from wrought-metal plates, said sections being shaped to the desired contour, butted and bolted or riveted together, and each having a threaded part, which when the sections are so joined are screwed into the tube, a coupling-knuckle forged from wrought metal and acting between said sections, and a stop-plate forged on one of said sections, substantially as described.

2. In a car-coupling, the combination of a shank made from a wrought-metal tube screwed interiorly at one end, and a coupler-head made in two sections from wrought metal manipulated in dies or cramps, said sections being butted and riveted or bolted together and each having a threaded part, which when the sections are so joined constitutes a screw and is engaged with the screwed part of the shank, substantially as described.

3. In a car-coupler, a head made in two sections from wrought metal and manipulated to the desired shape to afford space for the coupling - knuckle between dies or cramps, said sections being butted and bolted or riveted together and each of them having a threaded part, the two said parts constituting a screw by which the head is joined to the shank, substantially as described.

In witness whereof I have hereunto set my hand and seal the 29th day of September, 1891.

EDWARD WILLIAM MACKENZIE-HUGHES. [L. S.]

Witnesses:
 GEO. M. CRUIKSHANK,
*Chartered Patent Agent*, 62 *St. Vincent Street, Glasgow.*
 JNO. ARMSTRONG, Jnr.,
*Clerk*, 62 *St. Vincent Street, Glasgow.*